US007328006B2

United States Patent
Li

(10) Patent No.: US 7,328,006 B2
(45) Date of Patent: Feb. 5, 2008

(54) METHOD AND COMMUNICATION SYSTEM OF ASSOCIATED PHONE CALLING

(75) Inventor: Xin Li, Shenzhen (CN)

(73) Assignee: Shenzhen Dianjing Technology Co., Ltd. (CN)

( * ) Notice: Subject to any disclaimer, the term of this patent is extended or adjusted under 35 U.S.C. 154(b) by 492 days.

(21) Appl. No.: 11/005,580

(22) Filed: Dec. 6, 2004

(65) Prior Publication Data

US 2005/0227681 A1    Oct. 13, 2005

(30) Foreign Application Priority Data

Apr. 8, 2004    (CN) .................... 2004 1 0030770

(51) Int. Cl.
*H04M 3/42* (2006.01)
(52) U.S. Cl. ............ 455/417; 379/201.01; 379/202.01; 379/265.11; 379/214.01; 370/328; 370/210.01; 370/351; 370/325; 370/353; 370/354; 370/355; 370/356; 370/466; 370/467; 370/329
(58) Field of Classification Search ............... 455/417, 455/412, 420, 422.1, 450, 414.1–414, 456.3; 379/201.01, 265.11, 212.01; 370/322, 328, 370/329, 280, 210.01, 351–356, 466–467
See application file for complete search history.

(56) References Cited

U.S. PATENT DOCUMENTS 6,853,718 B1 *   2/2005   Bedingfield et al. ... 379/212.01
6,985,478 B2 *   1/2006   Pogossiants et al. ........ 370/352
6,999,757 B2 *   2/2006   Bates et al. ................. 455/417
2004/0258231 A1* 12/2004  Elsey et al. ............ 379/201.01
2005/0053217 A1*  3/2005  Reformato et al. .... 379/211.01
2005/0215243 A1*  9/2005  Black et al. ................ 455/417

FOREIGN PATENT DOCUMENTS

EP           0602779 A2 *   6/1994

* cited by examiner

*Primary Examiner*—Rafael Perez-Gutierrez
*Assistant Examiner*—Nimesh Patel

(57) ABSTRACT

A method for an associated phone calling is disclosed, that a mobile terminal needs to have association relationships with one or multiple communication terminals in a network. First, having received a call initiating by a mobile terminal which has an association relationship, said network determining a communication terminal as an associated terminal according to said association relationship; then said network initiating calls to a called terminal and said associated terminal, respectively; then having received answer messages from said called terminal and said associated terminal, said network establishing connection between said associated terminal and said called terminal. The invention also provides a communication system that implements said method, at least comprises a call processing equipment and a service control equipment. Applying the invention, a subscriber can initiate a call from a personal phone book in his mobile terminal and then communicates with called party with other terminal.

19 Claims, 5 Drawing Sheets

METHOD AND COMMUNICATION SYSTEM OF ASSOCIATED PHONE CALLING

CROSS-REFERENCE TO RELATED APPLICATIONS

This application claims the benefit of Chinese Application No. 200410030770.7 filed on Apr. 8, 2004. The disclosure of the above application is incorporated herein by reference.

FIELD OF THE INVENTION

The present invention relates generally to intelligent communication field, and more particularly to a method and communication system of an associated telephone calling.

BACKGROUND OF THE INVENTION

At present, a subscriber initiates a call through a mobile station (MS) or a telephone.

Since there is a personal phone book in a MS, a subscriber can make a call through the phone book; it is convenient, because it does not need to type number keys to make the call. In some cases, a subscriber may have two mobile phones at the same time. For example, when a subscriber is at other city for business, he may rent a local mobile phone at that city for saving money. In this case, usually the rented mobile phone does not have the personal phone book he wants. And when he makes a call, he needs to type in the called phone number, so it is inconvenient to initiate a call with the rented mobile phone.

A telephone is a fixed device; usually several people use the same telephone at different time, such as in an office or at home. It is impossible that every one has a personal phone book in one telephone, this makes a call inconvenient: you have to remember the called phone number and you must type in the called phone number.

On the other hand, using a mobile phone to make a call is a wireless communication; the signal is easily interfered and has some radiation.

SUMMARY OF THE INVENTION

With what has been mentioned above, objective of the invention is to provide an associated phone calling method and a communication system thereof to make that a subscriber initiates a call with a mobile phone, and communicates with called party in another terminal.

Further objective of the invention is that when a subscriber uses a mobile phone to initiate a call, he can communicate with called party with a fixed telephone, so the calling is convenient, the voice is clear and the communication is no radiation.

The invention of an associated phone calling method comprises the steps of:

Setting an association relationship between a mobile terminal and one or multiple communication terminals in a communication network;

Having received a call for a called terminal from the mobile terminal, said network determining one communication terminal as an associated terminal of the mobile terminal according to said association relationship;

Said network initiating calls to the called terminal and said associated terminal, respectively;

According to answers received from said called terminal and said associated terminal, said network establishing connection between said associated terminal and said called terminal.

Thereinto, said communication terminal includes fixed terminal.

Thereinto, said association relationship is that a prefix-number corresponds a communication terminal number; and said call brings a prefix-number; said prefix-number is used to determine an associated terminal.

Thereinto, said association relationship is that said mobile terminal is located in a location area that has area identification, an area identification corresponds a communication terminal number; and said area identification is used to determine an associated terminal.

Thereinto, association relationship is that having differentiated by different area identifications of the location area that said mobile terminal is located, a prefix-number is further used to determine an associated terminal; and said call brings a prefix-number; said area identification and said prefix-number are used to determine an associated terminal.

Thereinto, location area is a cell of a cellar system, an area positioned by Observed Time Difference Of Arrival (OTDOA) technique, an area positioned by a Globe Positioning System (GPS) or an area positioned by radio positioning technique for short distance.

Thereinto, said initiating calls by said network to a called terminal and associated terminal, respectively, comprises the steps of: initiating a call by said network to said called terminal first, and having received an answer message from said called terminal, said network initiating a call to said associated terminal.

Thereinto, the method further comprises: having received said answer message from said called terminal, said network establishing connection between said mobile terminal and called terminal.

Thereinto, the method further comprises disconnecting the connection between said network and said mobile terminal.

Thereinto, said initiating calls by said network to a called terminal and said associated terminal, respectively, comprises the steps of: initiating a call by said network to said associated terminal first; and having received an answer message from said associated terminal, said network initiating a call to said called terminal.

Thereinto, the method further comprises: the account of the mobile terminal being in charge of billing of communication between said associated terminal and called terminal.

Thereinto, wherein said connection between said associated terminal and said called terminal can serve voice or multimedia communication.

The invention of a communication system for an associated phone calling, comprises: a call processing equipment for call access and call connection and a service control equipment;

Wherein, said call processing equipment further comprises a detection and trigger mechanism of associated phone calling service, which initiates associated phone calling service according to subscriber signed information or special number segment for said associated phone calling service and reports to said service control equipment; and Wherein, said service control equipment is set service control logic and service data of associated phone calling service; when service control equipment has received the report from the call processing equipment, said service control equipment interacts with said call processing equipment, influences the call process according to the service control logic and controls the call processing equipment to establish connection between said associated terminal and called terminal.

Thereinto, said communication system is a mobile intelligent network, said call processing equipment is a Mobile Switching Center (MSC) or Gateway MSC (GMSC) with Service Switching Function (SSF), and said service control equipment is a Service Control Point (SCP).

Thereinto, said communication system is a third generation (3G) network, said call processing equipment is a Serving Call Session Control Function (S-CSCF), and said service control equipment is an Application Server (AS).

Thereinto said AS is a Session Initiation Protocol AS (SIP AS), a CAMEL Service Environment (CSE) accessed by an IP Multimedia Service Switching Function (IM-SSF) or an OSA Application Server (OSA AS) accessed by an OSA Service Capability Server (OSA SCS).

It can be seen from above, the invention provides an associated phone calling method and a system thereof. With this invention, a subscriber can use a phone book in his mobile phone to initiate a phone call conveniently, and communicate with called party in an associated phone, and when the associated phone is a fixed telephone, the voice is clear and the communication is no radiation.

Besides, the billing of the communication is made in the mobile phone that initiates the communication, so when many people use one associated phone, the billing is kept in every subscriber mobile phone; this is more reasonable.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
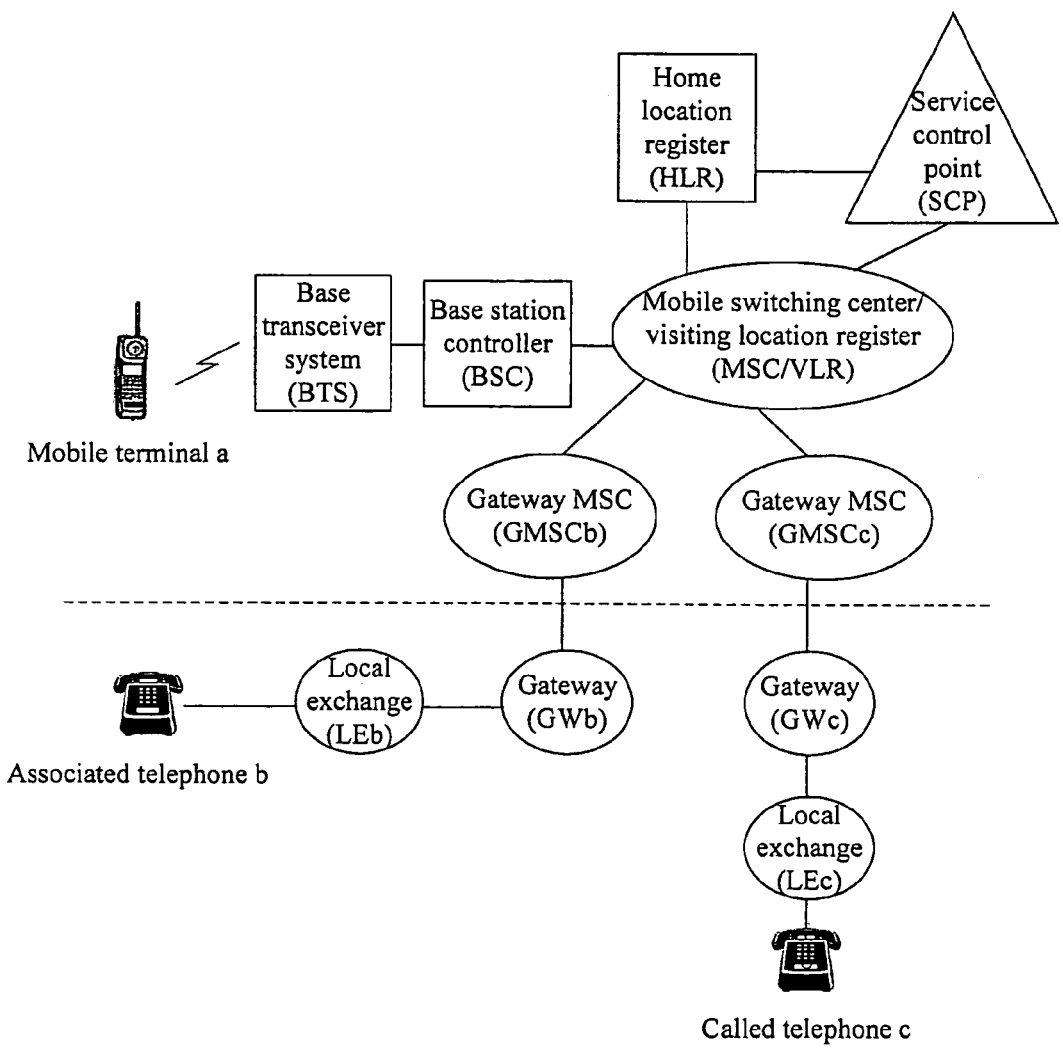
FIG. 1 shows a diagram of a telecommunication network.

The following description of the preferred embodiment(s) is merely exemplary in nature and is in no way intended to limit the invention, its application, or uses.

Said associated phone calling method mentioned in this invention means that: when a subscriber initiates a call to a network through a MS, according to preset associated phone of the calling party MS, the network initiates calls to called party and the associated phone, respectively, to set up a communication channel between the associated phone and the called phone; this makes that the calling subscriber can communicate with the called party with the associated phone.

To implement the above associated phone calling method, a communication system needs the following facilities: set a detection and trigger mechanism in call processing equipment, which accesses subscriber calls, to trigger the associated phone calling; set service control logic of said associated phone calling method in service control equipment to implement the method; and service data such as a corresponding relationship between the MS and its associated phone, etc. When said call processing equipment has reported a call to said service control equipment, through interaction between said call processing device and said service control equipment, the service control equipment influences the call process according to the service control logic stored in it and controls the call processing device to establish communication between the associated phone and the called phone.

To implement the above associated phone calling method, it is necessary to preset a subscriber signed information in the network side and a corresponding relationship information between the MS of the signed subscriber and its associated phones. The presetting of said information can be done by going to operator traffic office or by calling a special phone number or by short message or internet. The associated phone calling mainly implements in the following steps:

a) A signed subscriber originates a call to the called party from his MS; on having received the calling message, the network initiates the associated phone calling according to the signed information.

b) According to the corresponding relationship between the MS of the signed subscriber and associated phones, said network originates a call to one of associated phones to connect with the associated phone, on the other hand said network originates a call to the called party to connect with the called phone.

c) Said network relays the associated phone connection and the called phone connection to establish a connection between the associated phone and the called phone and releases the call of the MS. So the subscriber can make a conversation with the called party by using the associated phone.

The above connection procedure can be that the network originates a call to the called phone after having received an answer message from the associated phone, or the network originates a call to the associated phone after having received an acknowledge from the called phone, or the network originates calls to the associated phone and the called phone, respectively, at the same time.

To correspond relationship between a MS and an associated phone may have different ways: a MS takes a prefix-number to correspond an associated phone, a location area to correspond an associated phone, or a prefix-number and a location area to correspond an associated phone; these will be described in the following.

Taking a prefix-number to correspond an associated phone means to set a prefix-number that corresponds to an associated phone number; different prefix-number corresponds to different associated phone number; in this case, when a subscriber initiates a call, the called number takes the form 'prefix-number+called phone number'.

For example, suppose two prefix-numbers are 18001 and 18002, they correspond two associated phone numbers: number 1 and number 2, respectively; when a subscriber initiates a call: '18001+called phone number', the call will originates number 1 associated phone; when a subscriber initiates a call: '18002+called phone number', the call will originates number 2 associated phone.

Taking a location area to correspond an associated phone means to take identification (ID) of a location area where a MS is located corresponds to an associated phone number.

When a subscriber initiates a call, the network positions the area where the MS is located and corresponds the location area ID to an associated phone number. There are different positioning techniques.

One positioning technique is to identify the cell where a MS is located and take the cell ID to position the MS location; this positioning technique has been popularly used in a cellar network, and is technically simple, low cost but a lower positioning accuracy. Suppose a subscriber office and home are located in two different cells: cell A and cell B, then set cell A ID corresponds to the office telephone number and set cell B ID corresponds to the home telephone number. When the subscriber initiates a call in his office with the MS, it will be associated to the office telephone; and when the subscriber initiates a call in his home with the MS, it will be associated to the home telephone.

More accuracy positioning techniques may be used, such as the Observed Time Difference Of Arrival (OTDOA), which positions a MS by measuring arrival time difference of base station signals, the Globe Positioning System (GPS), or the radio positioning technique for short distance, for example, when a MS has a bluetooth module and moves to a fixed terminal with bluetooth detection point, the fixed terminal will report the MS position up to the network. Better positioning technique can have smaller size of location area of a MS, but has more complexity of devices and higher cost.

Taking a prefix-number and a location area to correspond an associated phone means that based on MS location area identification and then a prefix-number to correspond an associated phone number. This can be used in the situation that there are multiple associated phones in one location area.

For example, a subscriber office and home are at City 1, and in City 2 there is a building with an agent and living quarters. In this case, a prefix-number 18001 is corresponded to the associated phone number for the office and agent, and a prefix-number 18002 is corresponded to the associated phone number for the home and living quarters.

When the subscriber initiates a call in City 1 with the number '18001+called number', the associated phone will be the office telephone; when the subscriber initiates a call in City 2 with the number '18001+called number', the associated phone will be the agent telephone. Similarly, when the subscriber initiates a call in city 1 with the number '18002+called number', the associated phone will be the home telephone; when the subscriber initiates a call in city 2 with the number '18002+called number', the associated phone will be the living quarters telephone.

The method and system of the invention will be described in more detail with embodiments hereinafter.

First, the invention is used on a mobile intelligent network, i.e. the network is a mobile intelligent network that a MS is accessed to. In this network, the call processing equipment is implemented by a Service Switching Point/Mobile Switching Center/Gateway MSC (SSP/MSC/GMSC) with the Service Switching Function; the service control equipment is implemented by a Service Control Point (SCP) with the Service Control Function. The Home Location Register (HLR) stores a MS signed information, and the SCP stores service control logic of the associated phone calling service and service data including associated phone information of the MS.

When a subscriber initiates a call with a MS, the call is sent to a MSC that then triggers the associated phone calling service; the MSC sends the calling phone number and called phone number to the SCP and asks for calling processing; the associated phone calling service control logic in the SCP controls call flow in the MSC; the MSC originates a call to the associated phone to establish a voice channel between the called phone and the associated phone, so the subscriber uses the associated phone to communicate with the called party.

Figure 2:
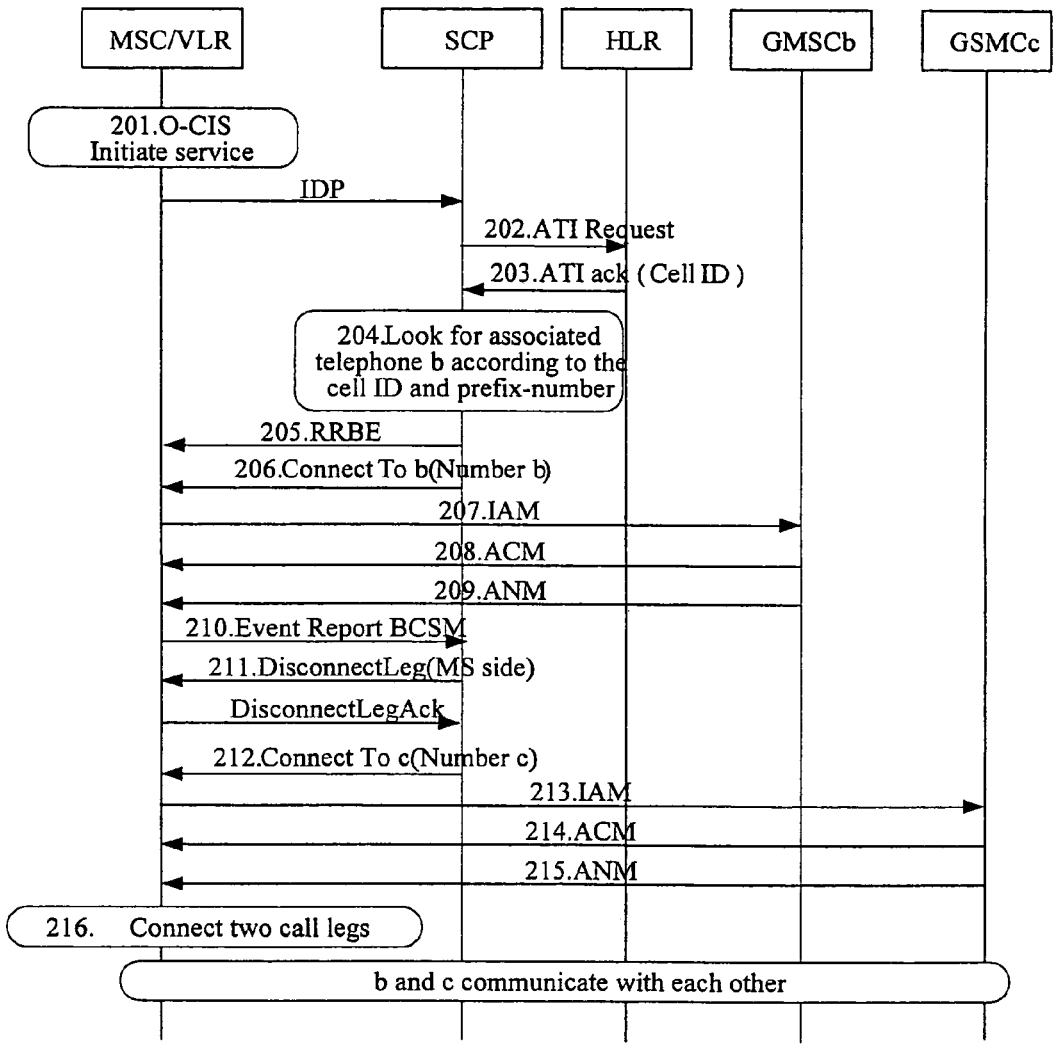
FIG. 2 shows a call flow diagram that the associated phone is called first.

FIG. 1 shows a mobile intelligent network, and the ISDN User Part (ISUP) protocol is used for signaling between the MSC and GMSC. Taking an example as follow: the MS a has registered an associated phone b, a fixed telephone, and the called phone is c, a fixed telephone too; when the MS initiates the call, the associated phone b is ringing, then the caller is changed to the associated phone b that communicates with the called phone c; in this embodiment, take a location area and a prefix-number, i.e. a cell ID and a prefix-number to correspond an associated phone number. FIG. 2 depicts the call flow diagram.

Step 201. The MS a originates a call with 'prefix-number+called phone c'. Since HLR has been put signed information of the MS to the MSC that the MS a is visiting, so having received the call, the MSC initiates an associated phone calling service with said signed information and sends an IDP message to the SCP.

Steps 202 to 203. Having initiated, the SCP sends HLR an Anytime Interrogation Request (ATI) message that requests the cell information where the MS is located; and then the HLR responses an Anytime Interrogation Acknowledge (ATI Ack) message that includes said cell ID.

Step 204. Having received the ATI Ack message including cell ID information, the SCP interrogates and obtains the associated phone number of the MS according to the cell ID and the prefix-number; in this embodiment the associated phone is b, and then go to Step 205; when it is impossible to obtain the associated phone number, such as the MS has not registered the service or there is no associated phone number for said cell ID and prefix-number, the reason will be prompted to the subscriber and the associated phone calling is ended instead of a general MS call that the subscriber uses the MS to communicate with the called party or ending the call.

Steps 205 to 209. The SCP instructs the MSC to originate a call to the associated phone b; when the associated phone b hooks off, the GMSCb responds to the MSC an Answer Message (ANM) and executes Step 210. If the associated phone b is busy or overtime for answer, then the reason will be prompted to the subscriber and the associated phone calling is ended instead of a general MS call that the subscriber uses the MS to communicate with the called party or ending the call.

Steps 210 to 212. Having received the answer message of the associated phone b reported by the MSC, the SCP instructs the MSC to originate a call to the called telephone number c and sends the MSC a DisconnectLeg message to release the connection between the MSC and the MS.

Steps 213 to 215. When the phone c hooks off, the GMSCc responds an ANM and the procedure goes to Step 216. If telephone c is busy or overtime for answer, then the reason will be prompted to the subscriber and the associated phone calling is ended.

Step 216. Having received the ANM of the called telephone c, the MSC connects a voice channel between the associated phone b and called telephone c, and then the subscriber can communicate with telephone c by the telephone b.

The above embodiment deploys signaling DisconnectLeg and DisconnectLegAck in Call Party Handling (CPH) of the CAMEL Application Part (CAP) that is part of the Customized Application for Mobile Networks Enhanced Logic (CAMEL) Phase 4 Release 5. The DisconnectLeg is to release a leg of the call and keeps other call legs unchanged, and the DisconnectLegAck is an acknowledge message from the SSP to SCP. For detail, please refer to the <<3GPP TS 23.078 V5.7.0>> standard. And the above embodiment allow SSF deal with the Connect message when the call just has only one call leg.

It can be seen from the above call flow that after the MS call has reached the network, the MS does not affect the service procedure any more, so the MS connection can be released at any step after Step 201. Perfectly after Step 209, i.e. after the associated phone has been hooked off.

Figure 3:
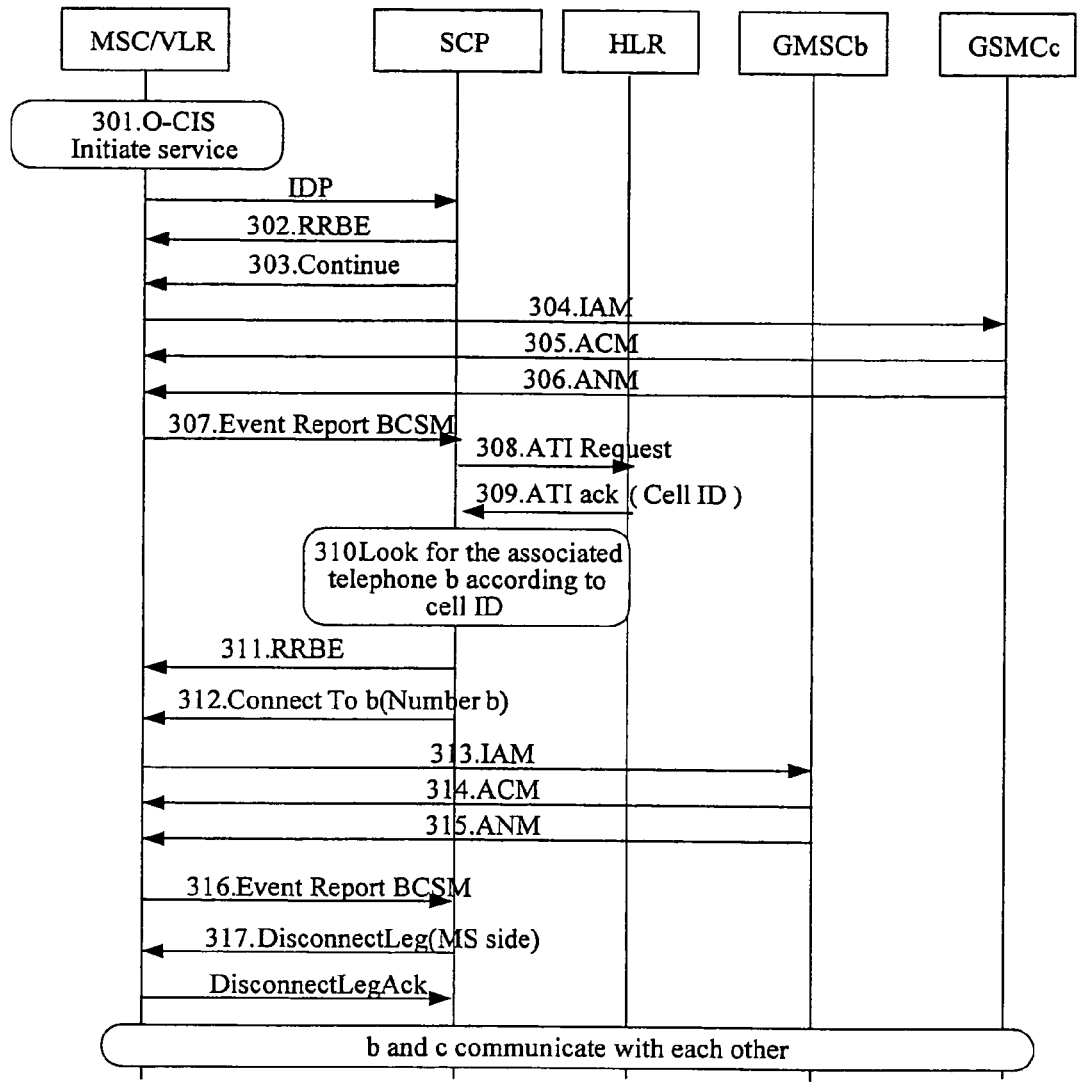
FIG. 3 shows a call flow diagram that the called party is called first.

FIG. 3 shows a call flow diagram that the called party is called first. Taking a cell ID to correspond an associated phone as an example, an associated phone calling method is described in more detail as follow:

Step 301. The MS a selects the called telephone number c from the phone book thereinto and makes the call. Having received the call initiated by the MS, based on the MS signed information that has been put on the MSC by the HLR, the MSC initiates the associated phone calling and sends an IDP to the SCP.

Steps 302 to 306. The SCP instructs the MSC to continue the call to the called telephone c; when the called telephone c hooks off, the GMSCc returns an ANM, then the MSC establishes the connection between the MS and the called telephone c, and then go to Step 307. If telephone c is busy or overtime for answer, then the reason will be prompted to the subscriber and the associated phone calling will be ended.

Steps 307 to 312. Having received the ANM of the called telephone c, the MSC reports to the SCP the answer message event. Then, the SCP sends an ATI request message to the HLR to ask for information of the cell where the MS is located; and the HLR returns an ATI Ack message that includes said cell ID. With the cell ID, the SCP finds the present associated phone b of the MS, and instructs the MSC to initiate a call to the associated phone b.

Steps 313 to 315. The MSC originates a call to the associated telephone b; when the phone b hooks off, the GMSCb returns an ANM and then the call flow goes to Step 316; if telephone b is busy or there is no one to response or the waiting time is expired, then the reason may be prompted to the subscriber and the associated phone calling will be ended, but the connection between the MS and the telephone c keeps unchanged.

Steps 316 to 317. Having received the answer message, the MSC reports the answer message event to the SCP. Then the SCP sends the MSC a DisconnectLeg message to release the connection between the MSC and the MS. Before said connection is disconnected, a prompt message about the associated telephone b has been hooked off may be sent to the subscriber. At this moment, the connection between the associated telephone b and the called telephone c has been established, so the subscriber can use the associated telephone b to communicate with telephone c.

In the above mention, the associated phone calling service is initiated by signed information that is registered by a subscriber. It is not difficult to understand for professionals in the art that the associated phone calling service can be initiated by an Overlay mode that initiates said service with a special number segment. In this case, the MSC analyzes the called number; if there is a characteristic code, said service is initiated. Except the initiation mode is different, all others are the same as those mentioned above, so no more description will be taken.

Figure 4:
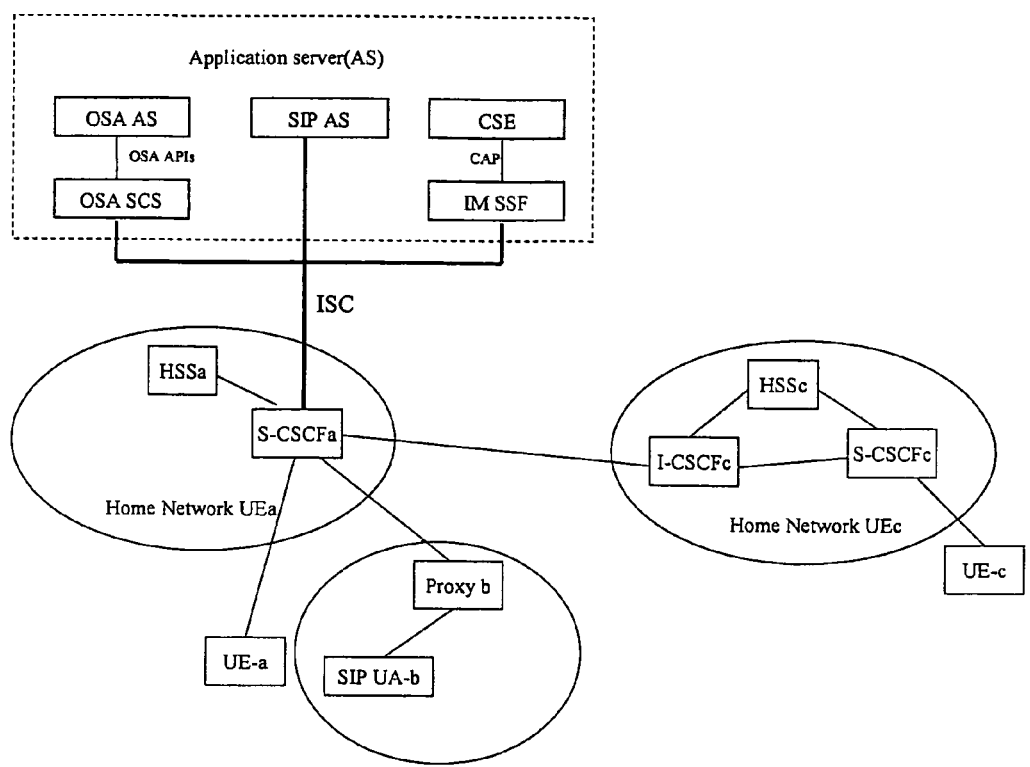
FIG. 4 shows a third generation (3G) network diagram based on SIP.

The above mention takes the Globe System for Mobile Communication (GSM) for description, but the method of the invention can be used in other network, such as CDMA network or the Third Generation network, and is independent of hardware platform or signaling or protocol. FIG. 4 shows a network based on the Session Initiation Protocol (SIP); wherein the Application Server (AS) implements the service control equipment. An AS can be implemented by a SIP Application Server (SIP AS), a CAMEL Service Environment (CSE) accessed by an IP Multimedia Service Switching Function (IM-SSF) or an OSA Application Server (OSA AS) accessed by an OSA Service Capability Server (OSA SCS). A Serving Call Session Control Function (S-CSCF) implements the call processing equipment in the network. A User Equipment (UE) is accessed to a S-CSCF in its Home network, and a User Agent (UA) is assessed to a Proxy. For detail, please refer to standard <<3GPP TS 23.218 V5.7.0>>.

Figure 5:
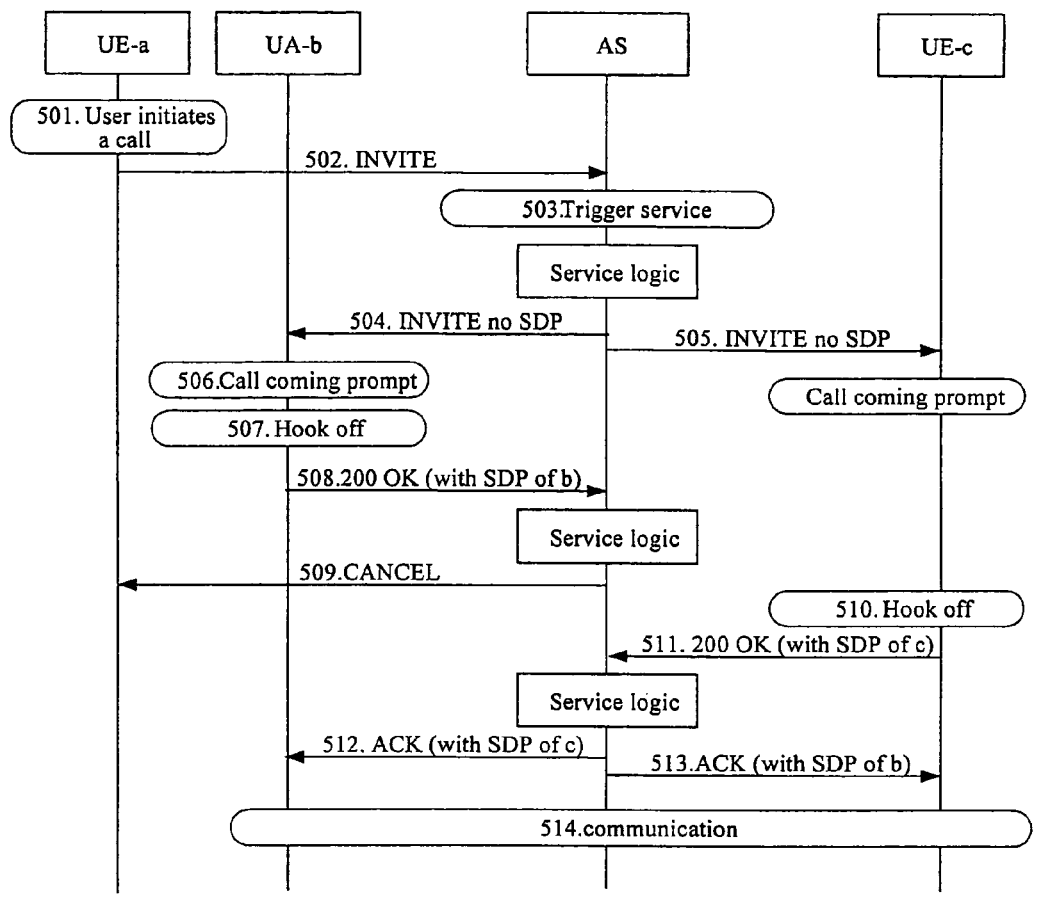
FIG. 5 shows a call flow diagram that calls the associated phone and called phone at the same time and based on SIP signaling.

FIG. 5 depicts a call flow diagram, in this embodiment the associated phone UA-b and the called phone UE-c are called at the same time, and a prefix-number corresponds the associated phone. The embodiment emphasizes the call flow of the SIP protocol, so those that do not affect said flow, such as S-CSCFa, I-CSCFc, S-CSCFc and Proxy b, have not been depicted.

Steps 501 to 502. The UE-a initiates an INVITE message that has a Request-URI that includes a prefix-number.

Steps 503 to 505. Having received the INVITE message, the AS initiates the associated phone calling service, carries out the service control logic to find the associated phone UA-b corresponding to the prefix-number; then the AS sends an INVITE message to the UE-c and at the same time, sends an INVITE message to the UA-b.

Steps 506 to 508. Having received the INVITE message, the UA-b prompts the user that a call is coming; then having hooked off by the user, the UA-b responds to the AS a 200 OK message.

Step 509. Having received the 200 OK message, the AS sends a CANCEL message to the UE-a for releasing the call from the UE-a to the AS.

Steps 510 to 514. After the UE-c has been hooked off, the connection between the UE-c and the UA-b is established and communication between them can be gone on.

The above description is the case that the UA-b is hooked off first. When the UE-c is hooked off first, the connection between the UE-a and the UE-c is established first, and then after the UA-b has been hooked off, the connection is changed to establish the connection between the UA-b and the UE-c for communication.

The invention provides an associated phone calling method and a system thereof. With this method, a subscriber can use a personal phone book in a mobile phone to initiate a phone call conveniently, and make conversation with called party in an associated phone. Specially, when the associated phone is a fixed telephone, the voice is clear and the communication is no radiation.

Besides, the billing of the communication is made in the mobile phone that initiates the communication, so when many people use one associated phone, the billing is kept in every subscriber mobile phone; this is more reasonable.

It can be seen from the above embodiments that the invention can be used in different bearer networks, and the communication can be voice or multimedia.

Of course, it is to be understood that the arrangement described in the foregoing is merely illustrative of the application and principles of the invention. Numerous and varied other arrangements may be utilized by those skilled in the art without departing from the spirit and scope of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An associated phone calling method, comprises the steps of:
   setting an association relationship between a mobile terminal and one or multiple communication terminals in a communication network;
   having received a call request for a called terminal from the mobile terminal, said network determining one communication terminal as an associated terminal of the mobile terminal according to said association relationship;
   said network initiating calls to the called terminal and said associated terminal, respectively;
   according to answers received from said called terminal and said associated terminal, said network establishing connection between said associated terminal and said called terminal.

2. The method of claim 1, wherein said communication terminal is a fixed terminal.

3. The method of claim 1, wherein said association relationship is that a prefix-number corresponds a communication terminal number;
   said call request is a call request carrying a prefix-number; and
   said determining one communication terminal as an associated terminal comprises the steps of: checking the prefix-number carried by said call request, and indexing to corresponding communication terminal number.

4. The method of claim 1, wherein said association relationship is that a location area identification of the mobile terminal corresponds a communication terminal number; and
   said determining one communication terminal as an associated terminal comprises the steps of: checking the location area identification of the calling mobile terminal, and indexing to corresponding communication terminal number.

5. The method of claim 4, wherein said location area is a cell of a cellular system, a location area divided by Observed Time Difference Of Arrival (OTDOA) position technique, a location area divided by Global Positioning System (GPS) technique or a location area divided by short distance radio positioning technique.

6. The method of claim 1, wherein said association relationship is that a combination of location area identification of the mobile terminal and prefix-number corresponds a communication terminal number;
   said call request is a call request carrying a prefix-number; and
   said determining one communication terminal as an associated terminal comprises the steps of: checking the prefix-number carried by said call request and the location area identification of the calling mobile terminal, and indexing to corresponding communication terminal number.

7. The method of claim 6, wherein said location area is a cell of a cellular system, a location area divided by Observed Time Difference Of Arrival (OTDOA) position technique, a location area divided by Global Positioning System (GPS) technique or a location area divided by short distance radio positioning technique.

8. The method of claim 1, wherein said network initiating calls to the called terminal and said associated terminal, respectively, comprises the steps of:
   at first, initiating a call to said called terminal,
   having received an answer message from said called terminal, initiating a call to said associated terminal.

9. The method of claim 8, after having received an answer message from said called terminal, further comprises:
   establishing connection between said mobile terminal and called terminal.

10. The method of claim 9 further comprises:
    releasing the connection between said network and said mobile terminal.

11. The method of claim 1, wherein said network initiating calls to the called terminal and said associated terminal, respectively, comprises the steps of:
    at first, initiating a call to said associated terminal;
    having received an answer message from said associated terminal, initiating a call to said called terminal.

12. The method of claim 1 further comprises:
    the account of the mobile terminal being in charge of billing of communication between said associated terminal and called terminal.

13. The method of claim 1, wherein said connection between said associated terminal and said called terminal serving voice or multimedia communication.

14. A communication system for an associated phone calling, comprises a call processing equipment for call access and call connection and a service control equipment;
   wherein, said call processing equipment further comprises a detection and trigger mechanism of associated phone calling service, which initiates associated phone calling service according to subscriber signed information or special number segment for said associated phone calling service on receiving a call request from a mobile terminal and reports to said service control equipment; and
   wherein, said service control equipment is set service control logic and service data of associated phone calling service; when service control equipment has received the report from the call processing equipment, said service control equipment interacts with said call processing equipment, influences the call process according to the service control logic and controls the call processing equipment to initiate calls to the called terminal and said associated terminal respectively and to establish connection between said associated terminal and called terminal according to answers received from said called terminal and said associated terminal.

15. The system of claim 14, wherein said communication system is a mobile intelligent network, said call processing equipment is a Mobile Switching Center (MSC) or Gateway MSC (GMSC) with Service Switching Function (SSF), and said service control equipment is a Service Control Point (SCP).

16. The system of claim 14, wherein said communication system is a third generation (3G) network, said call processing equipment is a Serving Call Session Control Function (S-CSCF), and said service control equipment is an Application Server (AS).

17. The system of claim 16, wherein said AS is a Session Initiation Protocol AS (SIP AS), a CAMEL Service Environment (CSE) accessed by an IP Multimedia Service Switching Function (IM-SSF) or an OSA Application Server (OSA AS) accessed by an OSA Service Capability Server (OSA SCS).

18. The method of claim 1, wherein said network establishing connection between said associated terminal and said called terminal according to answers received from said associated terminal further comprises the steps of:
   establishing connection between said associated terminal and said called terminal when said associated terminal is available; or said network establishing connection between said mobile terminal and said called terminal when said associated terminal is unavailable.

19. The method of claim 14, wherein said call processing equipment establishing connection between said associated terminal and called terminal according to answers received from said associated terminal further comprises the steps of:
   establishing connection between said associated terminal and said called terminal when said associated terminal is available; or said network establishing connection between said mobile terminal and said called terminal when said associated terminal is unavailable.

* * * * *